(12) United States Patent
Askelsen et al.

(10) Patent No.: US 11,130,686 B2
(45) Date of Patent: Sep. 28, 2021

(54) SYSTEMS AND METHODS FOR DOSING SLURRIES TO REMOVE SUSPENDED SOLIDS

(71) Applicant: Vermeer Manufacturing Company, Pella, IA (US)

(72) Inventors: Tayte Askelsen, Pella, IA (US); Corey Lanoue, Pella, IA (US); Andy Strobel, Knoxville, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 16/477,050

(22) PCT Filed: Jan. 5, 2018

(86) PCT No.: PCT/US2018/012460
§ 371 (c)(1),
(2) Date: Jul. 10, 2019

(87) PCT Pub. No.: WO2018/132306
PCT Pub. Date: Jul. 19, 2018

(65) Prior Publication Data
US 2019/0330088 A1    Oct. 31, 2019

Related U.S. Application Data

(60) Provisional application No. 62/444,567, filed on Jan. 10, 2017.

(51) Int. Cl.
*C02F 1/52*     (2006.01)
*C02F 11/14*    (2019.01)
*C02F 103/10*   (2006.01)

(52) U.S. Cl.
CPC .......... *C02F 1/5209* (2013.01); *C02F 1/5227* (2013.01); *C02F 11/14* (2013.01);
(Continued)

(58) Field of Classification Search
CPC ....... C02F 1/5209; C02F 1/5227; C02F 11/14
See application file for complete search history.

(56) References Cited

U.S. PATENT DOCUMENTS 3,020,231 A    2/1962  Colwell
3,262,877 A    7/1966  Compte, Jr.
(Continued)

FOREIGN PATENT DOCUMENTS

BR    102015031927 A2    6/2017
CS         270926 B1     8/1990
(Continued)

OTHER PUBLICATIONS

Profit, Gregoire et al—FR 2900060A1 Machine Translation—2007 (Year: 2007).*
(Continued)

*Primary Examiner* — Bradley R Spies
(74) *Attorney, Agent, or Firm* — Armstrong Teasdale, LLP

(57) ABSTRACT

Systems and methods for dosing slurries to remove suspended solids from the slurry are disclosed. The systems and methods may be used to dewater slurries having relatively high solids content such as earthen slurries. In some embodiments, the zeta potential of the slurry is monitored by an electroacoustic zeta potential sensor to control coagulant addition.

20 Claims, 8 Drawing Sheets

(52) U.S. Cl.
CPC .... *C02F 2103/10* (2013.01); *C02F 2201/002* (2013.01); *C02F 2201/008* (2013.01); *C02F 2209/04* (2013.01)

(56) References Cited

U.S. PATENT DOCUMENTS

| | | | |
|---|---|---|---|
| 3,542,674 | A | 11/1970 | Machlan |
| 3,594,313 | A | 7/1971 | Carlson |
| 3,830,736 | A | 8/1974 | Werdouschegg |
| 3,846,293 | A | 11/1974 | Campbell |
| 4,040,954 | A | 8/1977 | Chandler |
| 4,081,365 | A | 3/1978 | White et al. |
| 4,172,781 | A | 10/1979 | Walk et al. |
| 4,209,396 | A | 6/1980 | White et al. |
| 4,279,756 | A | 7/1981 | Weiss et al. |
| 4,294,656 | A * | 10/1981 | Beck ................ G01N 27/60 162/183 |
| 4,363,749 | A | 12/1982 | Weiss et al. |
| 4,468,128 | A | 8/1984 | Cobey |
| 4,497,208 | A * | 2/1985 | Oja ................ G01N 29/032 73/584 |
| 4,762,611 | A | 8/1988 | Schipper |
| 4,783,265 | A | 11/1988 | Timmons |
| 4,855,061 | A | 8/1989 | Martin |
| 4,950,908 | A | 8/1990 | Oblad et al. |
| 5,084,186 | A | 1/1992 | Gilchrist |
| 5,194,921 | A | 3/1993 | Tambo et al. |
| 5,200,086 | A * | 4/1993 | Shah ................ B01D 37/02 210/708 |
| 5,344,255 | A | 9/1994 | Toor |
| 5,365,775 | A | 11/1994 | Penniman |
| 5,373,229 | A | 12/1994 | Penniman |
| 5,433,853 | A * | 7/1995 | Mamone ............ B01D 17/047 210/615 |
| 5,452,233 | A | 9/1995 | Jachowicz et al. |
| 5,480,559 | A | 1/1996 | Smisson |
| 5,540,845 | A | 7/1996 | Blanchard et al. |
| 5,545,428 | A | 8/1996 | Crimp et al. |
| 5,582,733 | A | 12/1996 | Desbos et al. |
| 5,601,704 | A | 2/1997 | Salem et al. |
| 5,833,863 | A | 11/1998 | Richards et al. |
| 5,846,433 | A | 12/1998 | Sorensen et al. |
| 6,109,098 | A | 8/2000 | Dukhin et al. |
| 6,241,896 | B1 | 6/2001 | La Fargue, Jr. et al. |
| 6,325,706 | B1 | 12/2001 | Krusell et al. |
| 6,416,668 | B1 | 7/2002 | Al Samadi |
| 6,449,563 | B1 | 9/2002 | Dukhin et al. |
| 6,487,894 | B1 | 12/2002 | Dukhin et al. |
| 6,800,251 | B2 | 10/2004 | Catterall et al. |
| 6,878,268 | B2 | 4/2005 | Sawada |
| 6,910,367 | B1 | 6/2005 | Dukhin et al. |
| 6,915,214 | B2 | 7/2005 | Dukhin et al. |
| 7,074,339 | B1 | 7/2006 | Mims |
| 7,381,336 | B2 | 6/2008 | Stedman |
| 7,399,549 | B2 | 7/2008 | O'Hara |
| 7,418,881 | B2 | 9/2008 | Watson et al. |
| 7,686,957 | B2 | 3/2010 | Langlais |
| 7,695,630 | B2 | 4/2010 | de Guevara |
| 7,699,984 | B2 | 4/2010 | Andoh et al. |
| 7,737,316 | B2 | 6/2010 | Chang et al. |
| 7,871,194 | B2 | 1/2011 | Blasco et al. |
| 7,906,025 | B2 | 3/2011 | Bauer |
| 8,101,085 | B2 | 1/2012 | Guertin et al. |
| 8,281,662 | B2 | 10/2012 | Dukhin et al. |
| 8,302,780 | B1 | 11/2012 | Mitchell et al. |
| 8,454,837 | B2 | 6/2013 | Bauer |
| 8,506,821 | B2 | 8/2013 | Pruett et al. |
| 8,528,665 | B2 | 9/2013 | Jackson et al. |
| 8,564,774 | B2 | 10/2013 | Lewis |
| 8,573,404 | B2 | 11/2013 | McNeil-Watson |
| 8,580,121 | B2 | 11/2013 | Ladron de Guevara et al. |
| 8,675,197 | B2 | 3/2014 | Corbett |
| 8,702,942 | B2 | 4/2014 | Corbett et al. |
| 8,969,469 | B2 | 3/2015 | Shefelbine et al. |
| 9,289,805 | B2 | 3/2016 | Bagnoli |
| 9,341,559 | B2 | 5/2016 | Carr et al. |
| 9,341,564 | B2 | 5/2016 | McNeil-Watson |
| 2003/0178372 | A1 | 9/2003 | Droughton et al. |
| 2005/0005950 | A1 | 1/2005 | Greverath et al. |
| 2007/0084808 | A1 | 4/2007 | Williamson et al. |
| 2009/0277840 | A1 * | 11/2009 | Guertin ................ C02F 9/00 210/665 |
| 2010/0059453 | A1 | 3/2010 | Reardon et al. |
| 2011/0003677 | A1 | 1/2011 | Krammer et al. |
| 2011/0284475 | A1 | 11/2011 | Kolodny |
| 2013/0052105 | A1 * | 2/2013 | Butler ................ C02F 9/00 423/140 |
| 2013/0109078 | A1 | 5/2013 | Anthony et al. |
| 2013/0164812 | A1 | 6/2013 | Nicholas et al. |
| 2013/0168325 | A1 | 7/2013 | Song et al. |
| 2015/0001161 | A1 * | 1/2015 | Wiemers ............ B01D 17/047 210/739 |
| 2015/0022212 | A1 | 1/2015 | Jason et al. |
| 2015/0146202 | A1 | 5/2015 | Lewis |
| 2015/0344339 | A1 | 12/2015 | Taniguchi et al. |
| 2015/0362421 | A1 | 12/2015 | Lewis et al. |
| 2016/0146766 | A1 | 5/2016 | Leszczyszyn et al. |
| 2016/0252443 | A1 | 9/2016 | Spriggs |
| 2016/0252453 | A1 | 9/2016 | Lewis |
| 2016/0311710 | A1 | 10/2016 | Duesel, Jr. et al. |
| 2018/0086655 | A1 | 3/2018 | Malcolm |
| 2019/0330938 | A1 | 10/2019 | Askelsen et al. |

FOREIGN PATENT DOCUMENTS

| | | | | |
|---|---|---|---|---|
| EP | 134271 | A1 | 3/1985 | |
| EP | 129766 | B1 | 12/1989 | |
| EP | 2583948 | A1 * | 4/2013 | ............. C02F 1/463 |
| FR | 2900060 | A1 * | 10/2007 | ............. C02F 1/008 |
| JP | H10323506 | A | 12/1998 | |
| JP | 2001303887 | A | 10/2001 | |
| JP | 2002205075 | A | 7/2002 | |
| JP | 2003126611 | A | 5/2003 | |
| JP | 2007222835 | A | 9/2007 | |
| JP | 2009039683 | A | 2/2009 | |
| JP | 2010253424 | A | 11/2010 | |
| JP | 2011125790 | A | 6/2011 | |
| KR | 20160044209 | A | 4/2016 | |
| WO | 1999054741 | A1 | 10/1999 | |
| WO | 2002026350 | A1 | 4/2002 | |
| WO | 2005063630 | A1 | 7/2005 | |
| WO | 2006056022 | A1 | 6/2006 | |
| WO | 2010084635 | A1 | 7/2010 | |
| WO | 2010084945 | A1 | 7/2010 | |
| WO | 2010129132 | A2 | 11/2010 | |
| WO | 2014097402 | A1 | 6/2014 | |
| WO | 2015124942 | A2 | 8/2015 | |
| WO | 2015137330 | A1 | 9/2015 | |
| WO | 2015162411 | A1 | 10/2015 | |
| WO | 2016034902 | A1 | 3/2016 | |
| WO | 2016066992 | A1 | 5/2016 | |
| WO | 2016092022 | A1 | 6/2016 | |
| WO | 2018132309 | A1 | 7/2018 | |

OTHER PUBLICATIONS

Champagnac, Emilie et al—EP 2573948A1 Machine Translation—2013 (Year: 2013).*

"Eco-Friendly Filtration With Polymers", Rain for Rent Corporation, 4 pages, 2016, https://www.rainforrent.com/filtration-unit-rentals/eco-friendly-filtration-with-polymers/.

"Water Treatment Solutions: Increasing the Efficiency and Stability of Water Treatment Processes", Malvern, 8 Pages, available before Jan. 10, 2017.

"Zetasizer WT: On-line measurement of zeta potential, control your coagulation," Malvern, Oct. 13, 2016.

Ghernaout, at al. "Controlling Coagulation Process: From Zeta Potential to Streaming Potential", American Journal of Environmental Protection, 4(5-1), pp. 16-27, Apr. 28, 2015.

"Advantage Electronic Coagulation (EC-1)", CCI Chemical Corporation, https://ccichemical.com/products-services/advantage-ec-

(56) References Cited

OTHER PUBLICATIONS 1-electronic-coagulation-enhancement/, available before Jan. 10, 2017.

Model DT-300, Dispersion Technology Inc., 1 page, available before Jan. 10, 2017, https://dispersion.com/product/zeta-potential-probe-for-dispersions-and-emulsions/.

"AF-2 Automated Chemical Control", CCI Chemical Corporation, https://ccichemical.com/products-services/af-2-automated-chemical-control/, available before Jan. 10, 2017.

\* cited by examiner

SYSTEMS AND METHODS FOR DOSING SLURRIES TO REMOVE SUSPENDED SOLIDS

CROSS-REFERENCE TO RELATED APPLICATION

This application is the 35 U.S.C. § 371 national stage of International Application No. PCT/US2018/012460, filed Jan. 5, 2018, which claims the benefit of U.S. Provisional Patent Application No. 62/444,567, filed Jan. 10, 2017, both of which are incorporated herein by reference in their entirety.

FIELD OF THE DISCLOSURE

The field of the disclosure relates to systems and methods for dosing slurries to remove suspended solids such as systems and methods that may be used to dewater slurries having relatively high solids content such as earthen slurries. In some embodiments, the zeta potential of the slurry is monitored by an electroacoustic zeta potential sensor to control coagulant addition.

BACKGROUND

Various subsurface infrastructure such as power cables, water lines, gas lines, and product piping may be installed by drilling operations. Horizontal directional drilling is a trenchless drilling technique often used in urban areas and for crossing below roads or waterways. Drilling involves formation of a pilot hole along the drill path. The pilot hole is often reamed out to the size of the utility. During drilling, a viscous drilling fluid that typically contains bentonite or polymer is pumped to the cutting head. The drilling fluid, for example, cools the cutting head and carries drill cuttings away from the drill head through the drill bore. Spent drilling fluid may be collected by use of vacuum excavators. Such vacuum excavators may also collect fluid from vertical well drilling.

Vacuum excavators are also used in a process commonly referred to as "potholing", "daylighting" or "locating." Potholing involves use of high pressure water that loosens soil to create a hole to visually locate utilities. The mud slurry that is produced is removed by a vacuum and sent to a spoil tank. High pressure systems may also be used to cut trenches with the resulting slurry being sent to a spoil tank of a vacuum excavator. Vacuum excavators may also be used to remove water/mud slurries from valve and meter boxes to provide access to the boxes.

The raw slurry produced during drilling or potholing, typically collected by vacuum excavators, is conventionally landfilled or dumped at a designated disposal site. Landfill disposal of slurries containing a large amount of water may be relatively expensive compared to disposal of solids alone. It is advantageous to remove as much water from the slurry in order to reduce disposal weight and/or volume and to reduce fresh water use. Further, tightening regulations may limit disposal options for such slurries. The relatively high solids content of slurries prohibits their disposal in water treatment facilities, even after the slurry is pretreated to remove larger solids from the slurry.

A need exists for dewatering systems and methods for processing earthen slurries such as drill cuttings and cuttings from potholing that optionally allow the separated water to be recycled by reuse. A need exists for systems and methods that allow suspended solids to be removed from slurries with automated dosing of additives with relatively quick feedback.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a system for dosing a slurry to remove suspended solids. The system includes a batch mix tank and an electroacoustic zeta potential sensor in fluid communication with the batch mix tank. The system also includes a coagulant feed system for adding coagulant to the batch mix tank and a coagulant control system. The coagulant control system includes a controller communicatively coupled to the coagulant feed system and configured to terminate coagulant addition based on a zeta potential parameter.

Another aspect of the present disclosure is directed to a system for dosing a slurry to remove suspended solids. The system includes a coagulant feed system for adding coagulant to an infeed slurry. The coagulant feed system includes a coagulant mixing vessel, a first coagulant feed port formed in the coagulant mixing vessel and a first zeta potential sensor downstream of the first coagulant feed port. A first mixing zone of the coagulant mixing vessel is defined between the first coagulant feed port and the first zeta potential sensor. The coagulant feed system also includes a second coagulant feed port formed in the coagulant mixing vessel and a second zeta potential sensor downstream of the second coagulant feed port. A second mixing zone of the coagulant mixing vessel is defined between the second coagulant feed port and the second zeta potential sensor. The system for dosing a slurry to remove suspended solids also includes a coagulant control system. The coagulant control system includes a controller configured to control coagulant addition based on a zeta potential parameter sensed by the first and/or second zeta potential sensor.

Yet another aspect of the present disclosure is directed to a method for dewatering earthen slurries. Slurry is ejected from a slurry transport vehicle into a pretreatment system to remove an initial amount of solids from the slurry and produce a solids-depleted slurry. The solids-depleted slurry is introduced into a batch mix tank. Coagulant is added to the solid-depleted slurry in the batch mix tank to change the zeta potential of the slurry. Flocculant is added to the solid-depleted slurry in the batch mix tank to agglomerate suspended solids and form an agglomerated suspension. Solids are separated from the agglomerated suspension.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
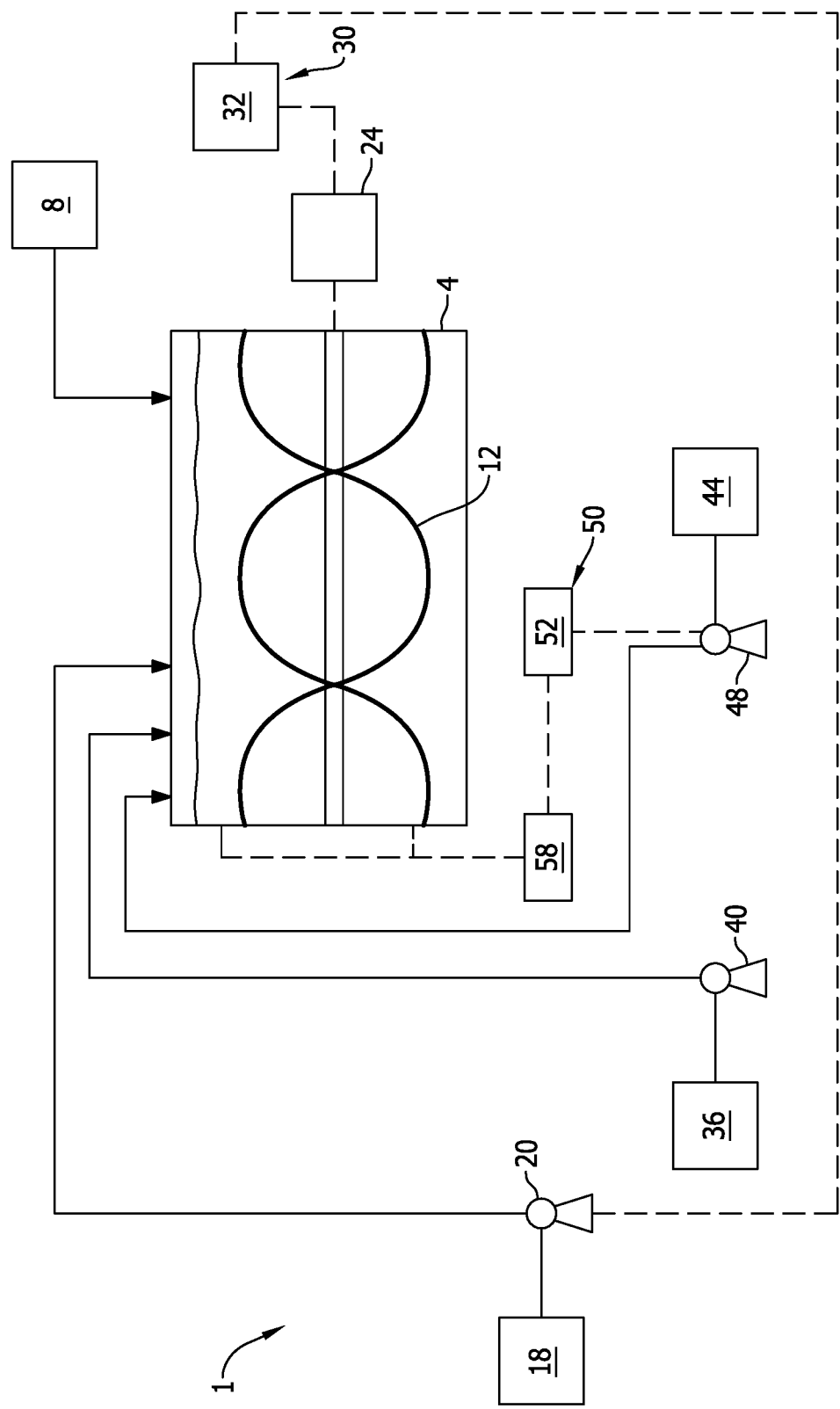
FIG. 1 is a schematic of a system for dosing a slurry to remove suspended solids.

A system 1 for dosing slurries such as pretreated earthen slurries is shown in FIG. 1. The system includes a batch mix tank 4 (or simply "mix tank"). Slurry to be processed is introduced into the mix tank 4 from slurry source 8. The batch mix tank 4 may include a mixing system 12 therein for mixing the slurry and additives.

Figure 2:
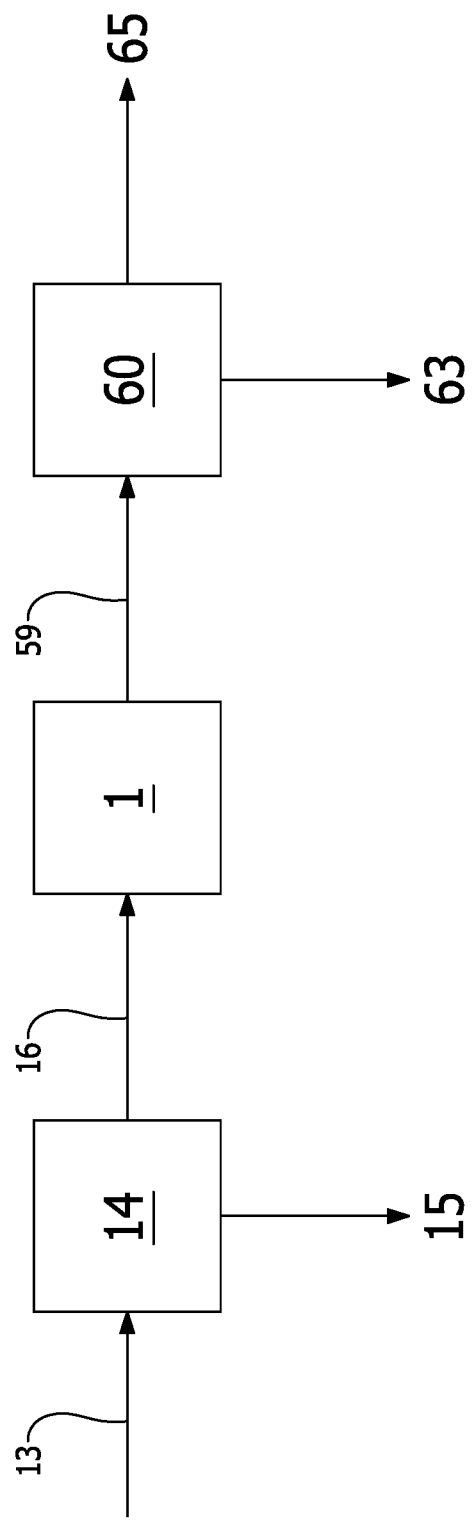
FIG. 2 is a schematic of a pretreatment system, the dosing system and a separation system for dewatering earthen slurries.

In some embodiments, the slurry that is processed is an earthen slurry 13 (FIG. 2) that has been processed in a pretreatment system 14. Earthen slurries 13 that may be pretreated include slurries of earth and water such as cuttings from a drill site (vertical drill or horizontal drill site) or from potholing, hydro-excavation trenching and/or from other excavation or mining sites in which earthen solids suspended in water are involved. Such slurries may be transported and offloaded for pretreatment 14 from vehicles known in the art as vacuum excavators and, particularly, hydro excavators.

The earthen slurry that is pretreated may include water and earth that was loosed during drilling/potholing or in a mining operation. The slurry may also include various additives that are added to the water for drilling purposes (e.g., to modify the viscosity of the fluid) such as bentonite and/or polymers. The slurry may include at least about 10 wt % solids, at least about 30 wt % solids or even at least about 50 wt % solids (e.g., from about 10 wt % to about 80 wt % solids or from about 30 wt % to about 80 wt % solids).

The earthen slurry 13 is introduced into a pretreatment system 14 to remove a first portion of solid particles 15 such as larger particles or clumps that are capable of settling in the slurry. The pretreatment system 14 may include various mechanical separation units that separate solids from the slurry by size or weight. Exemplary processing units that may be used include, for example, screens, shakers, centrifuges and the like. After pretreatment, the pretreated slurry 16 is depleted in solids relevant to the earthen slurry 13. The pretreated slurry 16 contains an amount of solids (e.g., suspended solids) such as at least about 10 wt % solids, at least about 30 wt % solids or even at least about 50 wt % solids (e.g., from about 10 wt % to about 80 wt % solids or from about 30 wt % to about 80 wt % solids). An exemplary pretreatment system that may be used is disclosed in U.S. Provisional Patent Application No. 62/393,151, filed Sep. 12, 2016 and entitled "Systems and Methods for Processing Earthen Slurries", published as U.S. Patent Publication No. 2018/0071662, which is incorporated herein by reference for all relevant and consistent purposes The slurry source 8 (FIG. 1) used in the dewatering system 1 may be pretreated slurry 16 that is collected in the pretreatment system 14 (e.g., a collection tank of the pretreatment system 14) or may be slurry that is stored downstream of pretreatment 14 such as slurry stored in a slurry source tank or container. The treatment system 1 of the present disclosure may be at or near the same site of the pretreatment system 14 such that the pretreated slurry is pumped or gravity fed to the system 1. Alternatively, slurry may be transported by one or more transport vehicles to the site of the system 1. The slurry may be introduced into the mix tank 4 directly from such transport vehicles, or such vehicles may offload slurry into a slurry storage tank.

In some embodiments, the batch mix tank 4 is sized to hold at least about 50 gallons of slurry or at least about 250 gallons, at least about 500 gallons, at least about 750 gallons or at least about 1000 gallons (e.g., from about 50 gallons to about 5,000 gallons, from about 500 gallons to about 1,000 gallons or from about 1,000 gallons to about 2,000 gallons).

Slurry from the slurry source 8 is introduced in the mix tank 4 by gravity feed or pumping. In some embodiments, the amount of slurry added to the mix tank 4 is controlled to achieve a desired fill height in the tank (i.e., to achieve a target fill height after each of slurry, dilution water, coagulant and flocculant are added to the tank). The volume of fluid in the mix tank may be continuously monitored and the solids content of the slurry sampled or monitored to determine the amount of dilution water that will be added to the tank as described below. The amount of flocculant added may be calculated based on the mass of solids added to the mix tank 4 or a set amount may be assumed to determine the volume of flocculant added. The volumes of dilution water and flocculant (and, optionally, coagulant which is generally negligible relative to the other volumes) and target fill level may be used to calculate and/or control the amount of slurry added to achieve the desired level/volume in the mix tank 4. In this regard, it should be noted that addition of slurry, dilution water and the coagulant dosing may be controlled as set forth in U.S. Provisional Patent Application No. 62/444,543, entitled "Systems and Methods for Dosing Earthen Slurries with an Additive to Modify a Fluid Property of the Slurry", filed Jan. 10, 2017, which is incorporated herein by reference for all relevant and consistent purposes.

Once the tank 4 has been filled, flow of slurry to the tank is stopped. In this regard, in various embodiments processing generally proceeds (e.g., additives are added to modify the physical properties of the slurry) according to a batch process in which slurry is not introduced or removed from the tank 4. Such batch processing may include recirculation loops which may be used to assist in mixing of the tank 4.

In some embodiments, water is added to the slurry to dilute the slurry to a preferred solids content. Water may be added directly to the mix tank 4 or may be added upstream (e.g., in a pretreatment collection vessel or added to the slurry feed stream or with the coagulant feed). In various embodiments, water may be added to dilute the slurry in the batch mix tank such that the slurry has less than about 60 wt % solids, less than about 50 wt % solids or less than about 40 wt % solids (e.g., from about 20 wt % to about 60 wt % or from about 20 wt % to about 40 wt % solids). In other embodiments, the slurry is not diluted (i.e., no water is added to the slurry after pretreatment). Water used for dilution may be stored in a water feed tank 36 and may be gravity fed or introduced into the mix tank 4 by water feed system 40 (shown as water feed pump which is in fluid communication with the water feed tank 36 and mix tank 4). Water may be mixed with the slurry in the mix tank 4 by use of a mixing system 12.

Coagulant is added to the mix tank from a coagulant source 18 (e.g., coagulant feed tank) during or after slurry 8 is introduced into the mix tank 4. Generally, suitable coagulants include materials that act to destabilize the slurry suspension through surface charge neutralization. The coagulant feed tank 18 may be any suitable container for holding coagulant including a dedicated tank, transportable totes or tanks, barrels or bins. Coagulant may be premixed in the tank 18 (added as a liquid or solid) or a ready-to-use formulation may be used. Coagulant may be fed to the mix tank 4 by a coagulant feed system 20 (shown as a pump that is in fluid communication with the coagulant feed tank 18 and batch mix tank 4). In some embodiments, coagulant is added to the mix tank 4 as a solid by use of the coagulant feed system. The coagulant feed system (and flocculant feed system described below) may include any suitable device for adding material including centrifugal pumps, displacement pumps (e.g., syringe-style pump), diaphragm pumps, peristaltic pumps and progressive cavity pumps.

During addition of coagulant into the mix tank 4 (either continuously or in one or more doses), a parameter related to the zeta potential of the contents of the mix tank is monitored. In some embodiments, the parameter is the sign of the zeta potential (i.e., negative charge or positive charge). As coagulant is added to the contents of the mix tank 4, the zeta potential of the slurry decreases from an initial level to zero (also known as the "isoelectric point" of the slurry), after which the sign of the zeta potential changes and the absolute value of the zeta potential increases with addition of more coagulant. Typically, the initial sign (i.e., charge) of the slurry is negative, however some slurries may have an initial positive sign. Alternatively or in addition to measurement of the zeta potential sign, in some embodiments, the magnitude of the zeta potential is measured.

Optionally, an initial amount of coagulant 18 may be added to the mix tank 4 based on a measured and/or calculated solid content or an assumed solid content of the batch mix tank. Subsequent doses may be determined based on the measured zeta potential parameter. Alternatively, the initial dose is determined from a measured zeta potential parameter.

The system 1 may include a zeta potential sensor 24 in fluid communication with the batch tank 4 to sense the zeta potential parameter (e.g., to measure the magnitude and/or sign of the zeta potential). In some embodiments, the zeta potential sensor is an electroacoustic sensor. Such an electroacoustic sensor may include a generator for generating either an oscillating acoustic pressure wave (as in colloidal vibration current applications) or an oscillating electric field voltage (as in electric sonic amplitude applications). In embodiments in which the generator produces an oscillating acoustic pressure wave, the zeta potential sensor typically includes a sensor for measuring colloidal vibration current. In embodiments in which the generator produces an oscillating electric field voltage, the zeta potential sensor typically includes a sensor for measuring colloidal potential (i.e., voltage).

The electroacoustic zeta potential sensor measures a phase shift from the generated signal and the measured signal. This phase may be correlated to the zeta potential (e.g., the zeta potential sign). Phase offset between 90° and 270° may represent a negative zeta potential and between 270° and 90° may represent a positive zeta potential. In some embodiments, only the phase shift of the zeta potential is measured (i.e., to determine a sign change) and other parameters that are used to determine the magnitude such as particle size are not measured.

In some embodiments, the signal-to-noise ratio threshold used to record a data point by the sensor 24 is reduced relative to lab grade analyzers to lower the time period in which the zeta potential parameter is measured. For example, the zeta potential may be recorded at least every 2 minutes or at least every 1 minute, at least every 30 seconds, at least every 20 seconds, at least every 10 seconds or even at least every 5 seconds. In some embodiments, the sensor 24 may be configured (e.g., by lowering the threshold at which the sensor records a data point ratio relative to lab grade analyzers) to provide an accuracy of at least +/−1 mV, at least +/−3 mV or even at least about +/−5 mV (e.g., +/−1 mV to +/−10 mV).

To provide a signal, the sensor 24 may collect data for a period of time (e.g., 1, 5, 10 or even 20 seconds). The derivative of the measured zeta potential may be calculated to determine if a steady state reading is obtained. Optionally, the derivative of the zeta potential may be passed through a smoothing filter to obtain a clearer signal. Once the zeta potential derivative reaches a threshold value, the reading may be recorded. The reading may be used to control coagulant addition as described below.

The zeta potential sensor 24 should be distinguished from streaming current sensors. In embodiments in which an electroacoustic zeta potential sensor is used, the sensor should be distinguished from sensors that operate by electrophoretic light scattering.

The zeta potential sensor 24 is in fluid communication with the mix tank 4 and, in some embodiments, is in direct fluid communication with the mix tank 4 (i.e., samples the slurry in the batch mix tank and/or a recirculation loop or slip stream and not the contents downstream after discharge from the tank). A coagulant control system 30 controls addition of coagulant based on an output from the sensor 24. The coagulant control system 30 includes a controller 32 that is configured to send a signal to terminate coagulant addition based on a sign change and/or magnitude of the zeta potential. The coagulant control system 30 is communicatively coupled to the zeta potential sensor 24. The control system 30 is also coupled to the coagulant feed system 20 to control coagulant addition. In the illustrated embodiment, the control system 30 is communicatively coupled to the coagulant pump 20 to operate the coagulant pump 20 (e.g., to start and stop the pump) and stop the pump 20 upon the desired zeta potential being achieved. In other embodiments, the control system 30 may be coupled to a valve (not shown) that controls the amount of coagulant added (e.g., a valve that may open or close to divert coagulant from the batch mix tank) such as in a coagulant recirculation loop.

In some embodiments, the control system 30 stops coagulant addition upon a change in the sign of the zeta potential (i.e., from a negative to positive charge or from a positive to negative charge). In other embodiments, the sensor 24 measures the magnitude of the zeta potential and the control system 30 stops coagulant addition upon the zeta potential reaches a set point (e.g., set point range of +/−50 mV or +/−30 mV).

In some embodiments, an initial dose of coagulant is added to the batch mix tank and the zeta potential is measured after sufficient mixing. Successive doses of coagulant may be added with the zeta potential being measured after each dose until the desired set point is reached (e.g., a change in the sign of the zeta potential or the zeta potential is sufficiently close to 0).

Exemplary coagulants that may be used to change the zeta potential of the contents of the mix tank 4 (i.e., to change the sign of the zeta potential or and/or to adjust the absolute value of the zeta potential closer to zero) include hydrolyzing metal salts (e.g., aluminum sulfate, ferric chloride or sulfate), pre-hydrolyzed metal salts (e.g., polyaluminum chloride or sulfate or polyiron chloride) or synthetic polymers including cationic polymers (e.g., epi-DMA, aminomethyl polyacrylamide, polyalkylene, polyamines or polyethylenimine).

After the sign of the zeta potential changes or the absolute value of zeta potential is sufficiently close to 0 to allow coagulant addition to be stopped, flocculant is added to the batch mix tank 4. Flocculant may be stored in flocculant tank 44 and fed to the mix tank 4 by a flocculant feed system 48 (shown as a flocculant feed pump that is in fluid communication with flocculant feed tank 44 and mix tank 4). The flocculant feed tank 44 may be any suitable container for holding flocculant including a dedicated tank, transportable totes or tanks, barrels or bins. In some embodiments, the flocculant feed system 48 includes two flocculant pumps and/or flocculant feed tanks to allow two different flocculants to be added to the mix tank 4. In other embodiments, after addition of coagulant, the coagulated slurry is introduced into a separate flocculant mix tank (not shown). Flocculant is then added to this flocculant mix tank to produce floc and settle-out solids.

Suitable flocculants that may be added to the batch mix tank include materials that cause suspended particles to aggregate and form flocs. Examples of flocculant include synthetic cationic polymers (e.g., polydiallyldimethyl chloride, polydimethyl aminomethyl polyacrylamide, polyvinylbenzyl or trimethyl ammonium chloride), synthetic neutral polymers (polyacrylamides), synthetic anionic polymers (hydrolyzed polyacrylamides, polyacrylic acid, polystyrene sulfonate or polyacrylates), natural polymers (e.g., sodium alginate, chitosan or starch) and inorganic flocculants (e.g., aluminum chloride, aluminum chlorohydrate, aluminum chlorohydroxide, bentonite or kaolite clays).

Flocculant addition to the batch mix tank 4 may be regulated by a flocculant control system 50 having a controller 52 that is configured to control the flocculant feed system 48. In some embodiments, the system 1 includes an interface sensor 58 that is communicatively coupled to the flocculant control system 50 to control the amount of flocculant added to the batch mix tank 4. The interface sensor 58 senses settling in the tank 4 that results from agglomeration of solids upon addition of flocculant. As flocculant is added, solids begin to agglomerate together causing them to settle, typically toward the bottom of the tank. Suitable interface sensors include, for example, a camera imaging system or a differential pressure gauge (e.g., with ports being stacked vertically relative to the vertical axis of the tank) or two pressure gauges arranged vertically along the vertical axis. Increases in the pressure difference along the vertical axis of the tank 4 indicate settling of solids.

In other embodiments, the interface sensor 58 is a zeta potential sensor that is positioned toward the bottom of the tank. Such a zeta potential sensor could be the zeta potential sensor 24 described above or could be a second zeta potential sensor. In embodiments in which the interface sensor 58 is a zeta potential sensor, the sensor 58 measures the magnitude of the zeta potential, which is believed to rise upon settling of solids. In other embodiments, the sensor 58 is a laser, ultrasonic sensor or guided or unguided radar sensor or flocculant addition may be controlled based on, at least in part, the torque transmitted by the mixing system 12 and/or the turbidity of the water toward the top of the mix tank 4.

In some embodiements, the interface sensor 58 is also used to control the addition of water from water feed tank 36 during dilution. The measured pressure difference, in combination with assumed specific gravity for solids and the specific gravity of water, may be used to determine the solids content. Dilution water may be added and mixed with the earthen feed slurry by mixing system 12 until the desired dilution has been achieved.

During addition of additives to the mix tank 4, a mixing system 12 mixes the contents of batch mix tank 4. In the illustrated embodiment, the mixing system 12 is a mixing auger. In other embodiments, the mixing system 12 may be a rolljet, propeller or other style mixer. Preferably, the mixing system 12 is capable of providing a variable shear input to the fluid (e.g., variable mixing speed) depending on the stage of mixing (e.g., dilution, coagulation or flocculation).

After flocculation, the mixing system 12 may be stopped or reduced in speed and flocs are allowed to settle. The flocculated slurry is then discharged from the batch mix tank 4. The flocculated slurry may be gravity drained, pumped or tipped from the tank 4. The flocculated slurry 59 (FIG. 2) may then be introduced into a separation system 60 to produce a solid fraction 63 and liquid fraction 65. The separation system 60 may separate the solid fraction 65 from the flocculated slurry 59 by sedimentation, centrifugation (e.g., decanter centrifuge, basket centrifuge, screen centrifuge or hydrocyclones), filtration (e.g., belt press, filter press, filter bags or vacuum filtration) and/or by thermal drying.

Figure 3:
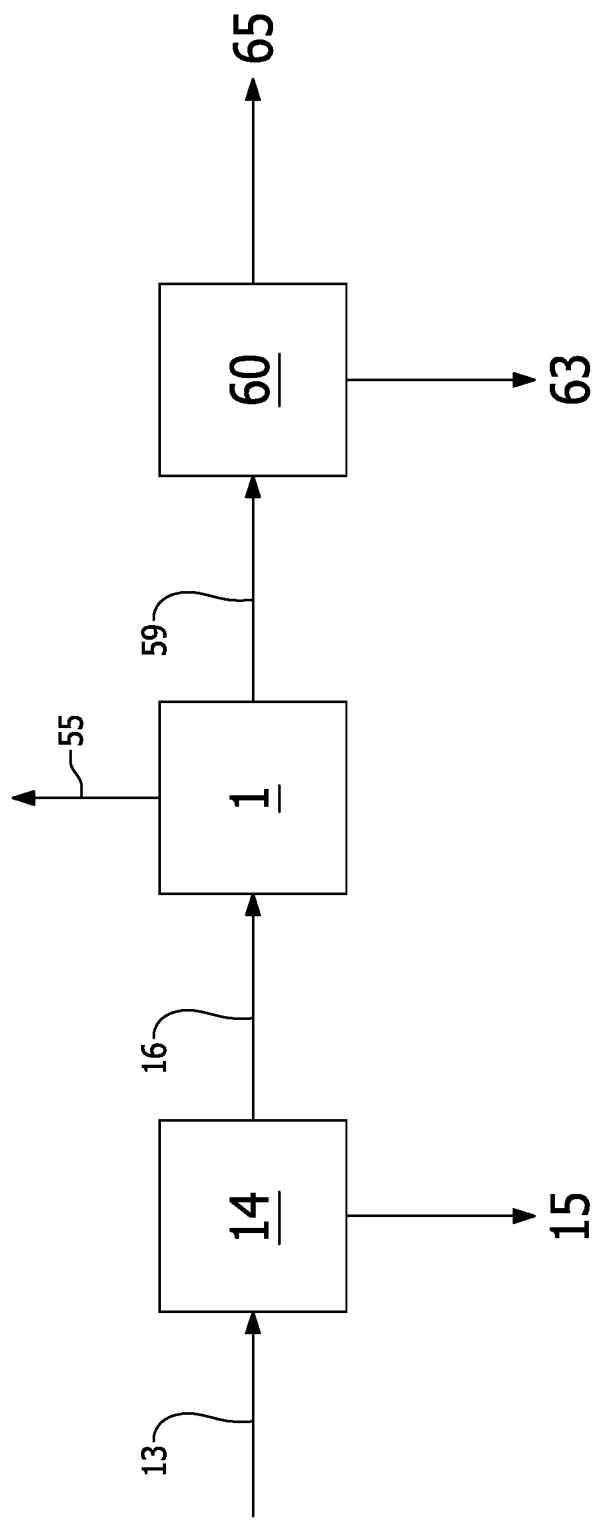
FIG. 3 is a schematic of a pretreatment system, the dosing system and a separation system for dewatering earthen slurries in which water is decanted from the dosing system.

In some embodiments and as shown in FIG. 3, water above the interface of the settled solids (i.e., supernatant water) is removed before the solids are discharged. This supernatant water 55 may be separated by gravity draining the water through a discharge above the solid-liquid interface or by tipping the tank 4 and taking a first cut of liquid as supernatant water. In embodiments in which solids are gravity drained or the batch mix tank 4 is tipped to discharge the solids, removing supernatant water may reduce the amount of turbulence and "sloshing" of solids which may break apart the flocs in the settled solids. Removal of the supernatant water 55 from the system reduces the throughput capacities required of the separation system 60 (e.g., at least about 20%, at least about 40% or at least about 60% of the water in the batch mix tank may be removed as supernatant water). Additionally, removal of the supernatant water 55 may allow for a more consistent feed to the separation system 60 as settled solids may have a similar solid content from batch to batch. This allows the separation system 60 to be tuned for the more consistent feed to improve throughput. The separated supernatant water 55 may have a lower turbidity than the liquid fraction 65 recovered from the separation system 60 allowing it to be disposed of separately from the liquid fraction 65 (e.g., recycle such as by backwashing filters or the like). In other embodiments, the separated supernatant water 55 is disposed with the liquid fraction 65.

Figure 4:
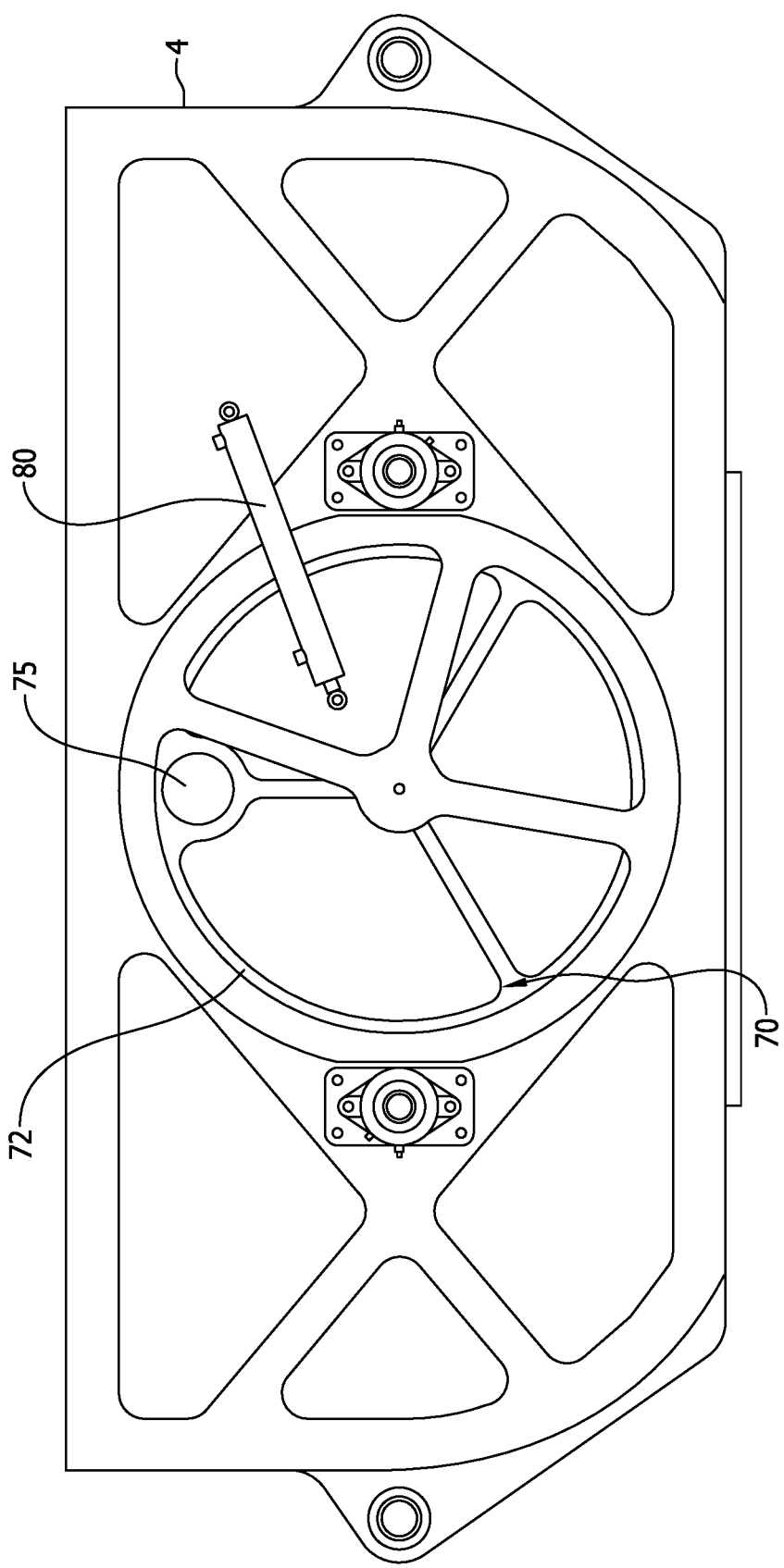
FIG. 4 is a side view of a batch mix tank having an adjustable weir with the weir in a raised position.
Figure 5:
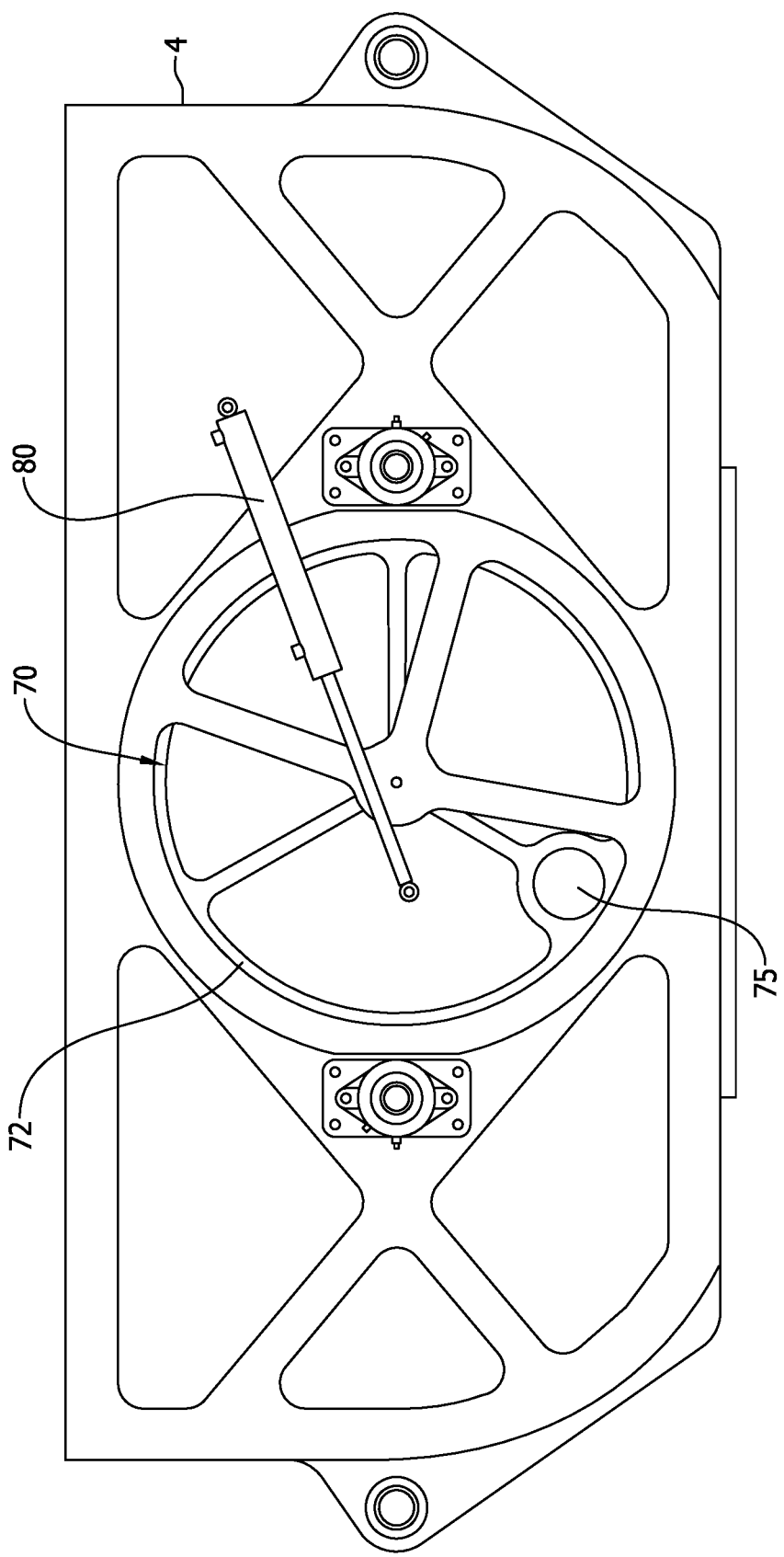
FIG. 5 is a side view of the batch mix tank of FIG. 4 with the weir in a lowered position.

In some embodiments and as shown in FIGS. 4 and 5, the batch tank 4 may be fitted with an adjustable weir 70 to allow the supernatant water to be decanted. The weir 70 comprises a rotary plate 72 and a discharge port 75 along one wall of the tank 4. Operating the actuator 80 causes the plate 72 to rotate and allows adjustment of the height of the discharge port 75. In its topmost position shown in FIG. 4, the discharge port 75 is above the surface level of the slurry when the mix tank 4 is filled to capacity (or alternatively the discharge port is fitted with a valve to control when supernatant water is discharged). In the lowest position shown in FIG. 5, the discharge port 75 is above the height of the solid-liquid interface as determined by interface sensor 58 (FIG. 1). The lowest position of the discharge port 75 may be near this interface to maximize the volume of supernatant water that can be drained from the mix tank 4.

In other embodiments, a wall of the tank 4 may be adjustable in height to allow supernatant water to overflow the wall after settling is complete. For example, a wall of the tank 4 may be pivotable from its bottom to allow the top of the wall to pivot downward. Alternatively, a series of vertically stacked valves or removable plates may be used to drain supernatant water in discrete increments rather than continuously. In any of its various embodiments, the position of the weir may be controlled via feedback from the interface sensor 58 to prevent the weir from being lowered to below the solid-liquid interface.

In other embodiments, the outlet to the batch tank is fixed (i.e., not vertically adjustable) and positioned at a vertical height that is above the position at which the solid-liquid interface typically occurs.

In this regard, it should be noted that some flocculated solids may float. The amount of solids which may float are expected to be small (e.g., less than 5%, less than 1% or less than 0.5% of the total flocculated solids) relative to the amount of solid which settle in the batch mix tank 4. Any floating solids may be removed from supernatant water and, optionally, filtered from the supernatant water (e.g., bag or cartridge-style filters).

The solid fraction 63 from the separation system 60 may be disposed by re-use in construction or may be landfilled. The liquid fraction 65 and/or supernatant water 55 may be disposed by re-use in drilling operations, discharged to a wastewater treatment system or used in other applications such as in dust control, irrigation or other non-potable uses. The liquid fraction 65 is depleted in solids relative to the pretreated slurry 16. In some embodiments, at least about 90 wt %, at least about 95 wt % or even at least about 98 wt % (e.g., from about 90 wt % to about 100 wt % of from about 95 wt % to about 100 wt %) of the solids in the pretreated slurry 16 are removed by the treatment system 1 and separation system 60.

In some embodiments, the liquid fraction 65 is monitored by one or more sensors (not shown) and the output from the sensors is used, in part, to modify the amount of water added for dilution or coagulant or flocculant addition.

Figure 6:
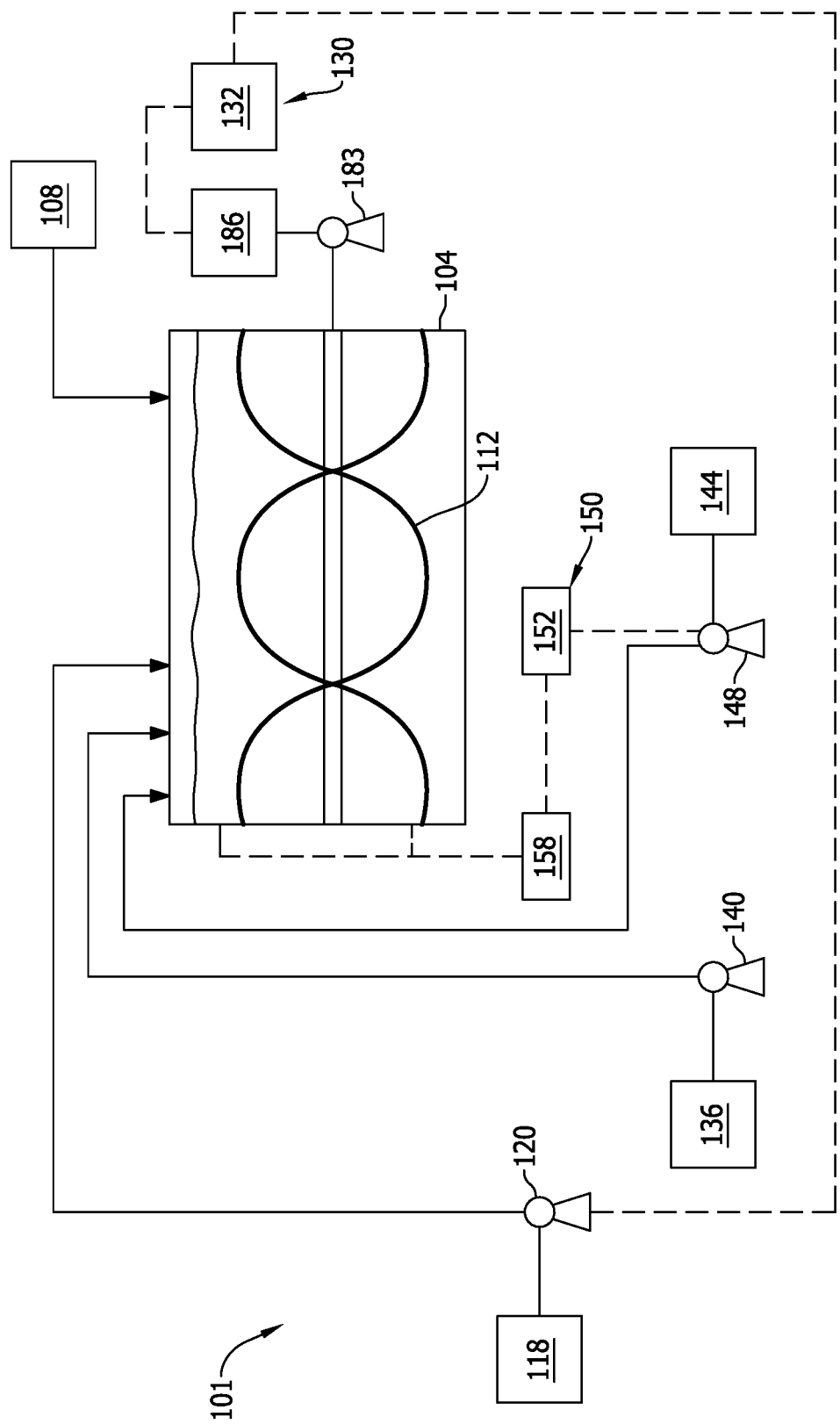
FIG. 6 is a schematic of another embodiment of a system for dosing a slurry to remove suspended solids having a dosing control system with a separate sampling vessel.
Figure 7:
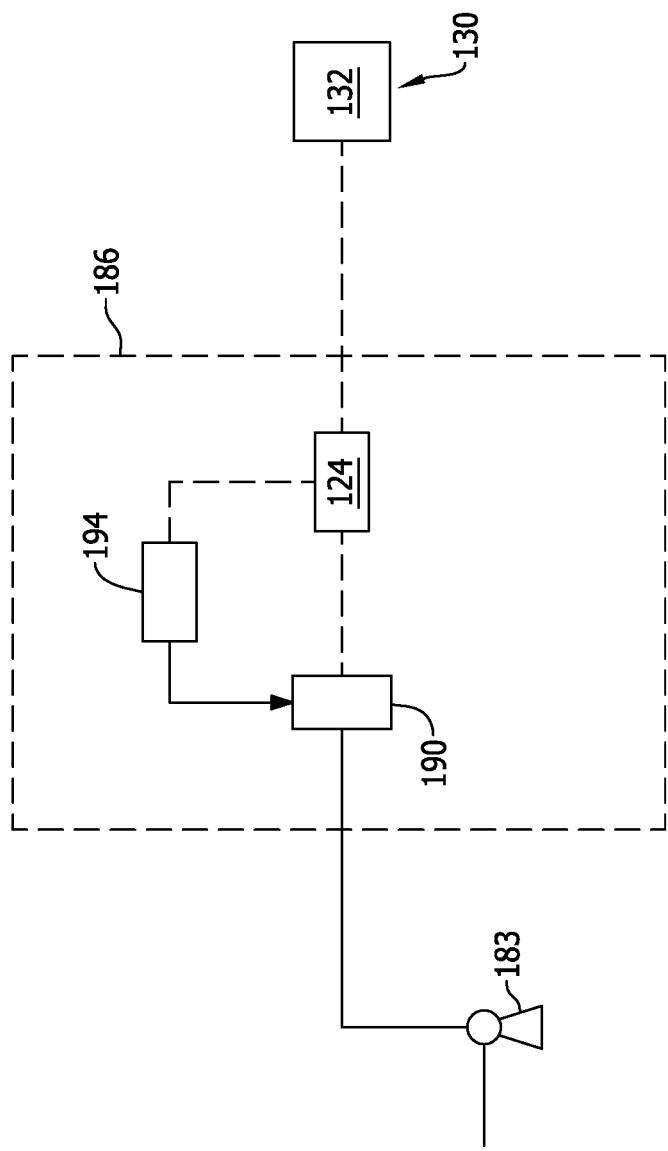
FIG. 7 is a schematic of the dosing control system of FIG. 6.

Another embodiment of a system 101 for dosing a slurry is shown in FIG. 6. The components shown in FIG. 6 that are analogous to those of FIG. 1 are designated by the corresponding reference number of FIG. 1 plus "100" (e.g., part 18 becomes 118). The system 101 includes a sampling pump 183. The sampling pump 183 introduces slurry into a dosing control system 186. The dosing control system 186 includes a sampling vessel 190 (FIG. 7) and a coagulant source 194. A known volume of slurry is added to the vessel 190. Coagulant is added to vessel 190 from coagulant source 194 until a zeta potential sensor 124 senses that the zeta potential is within a set-point range or that the sign of the zeta potential has changed. A coagulant control system 130 having a controller 132 is communicatively coupled to the coagulant feed system 120 to control addition of coagulant to the batch tank 104. Coagulant is added to the batch tank 104 based on the amount of coagulant needed to approach or reach the isoelectric point (i.e., change in the sign of the zeta potential) in the processed sample (i.e., based on the volumetric ratio of the mix tank value to sample volume).

Figure 8:
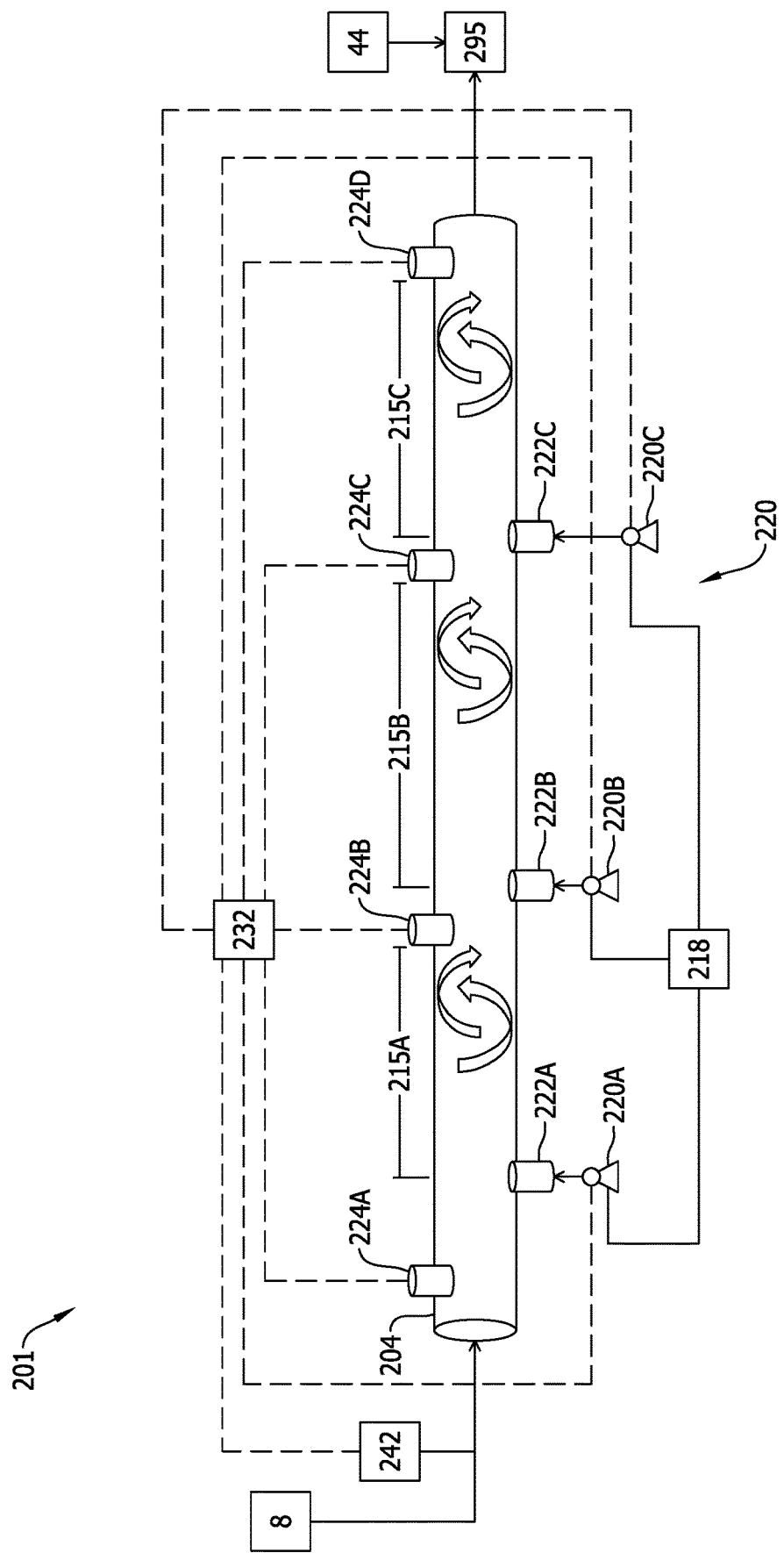
FIG. 8 is another embodiment of a system for dosing a slurry to remove suspended solids.

Another embodiment of a system 201 for dosing a slurry is shown in FIG. 8. The components shown in FIG. 8 that are analogous to those of FIG. 1 are designated by the corresponding reference number of FIG. 1 plus "200" (e.g., part 18 becomes 218). The system 201 includes a coagulant mixing vessel 204 and a coagulant feed system 220 (shown as pumps 220A, 220B, 220C) that is in fluid communication with the mixing vessel 204. Coagulant is added into the mix vessel 204 in a plurality (three shown) of coagulant feed ports 222A, 222B, 222C formed in the mixing vessel 204. Coagulant may be added by pumps 220A, 220B, 220C as shown or injection plungers or the like may be used.

The coagulant feed system includes a plurality of zeta potential sensors 224A, 224B, 224C, 224D communicatively coupled to a controller 232. The zeta potential sensors 224A, 224B, 224C, 224D are used to sense the magnitude and/or sign of the zeta potential as coagulant is added through ports 222A, 222B, 222C. The zeta potential sensors 224A, 224B, 224C and 224D may be electroacoustic sensors. The first zeta potential sensor 224A measures the magnitude or sign of the zeta potential of the incoming slurry from slurry source 8. This information may be processed in controller 232 to determine the proper dose of coagulant to add through coagulant port 222A. Alternatively, the properties of the incoming slurry such as mass and/or solids concentration can be sensed by sensor 242 (which may be a series of sensors) which is communicatively coupled to controller 232 to determine the proper dosing. In embodiments in which the solids content and/or mass of the incoming slurry is sensed, the first zeta potential sensor 224A may optionally be eliminated.

The second zeta potential sensor 224B is downstream of the first coagulant feed port 222A. A first mixing zone 215A is formed between the second zeta potential sensor 224B and the first port 222A. The third zeta potential sensor 224C is downstream of the second coagulant feed port 222B and a second mixing zone 215B is formed between the third sensor 224C and second port 222B. A fourth zeta potential sensor 224D is downstream of the third coagulant feed port 222C and a third mixing zone 215C is formed between the fourth sensor 224D and third port 222C. Each of the zeta potential sensors 224A, 224B, 224C may be used to sense a zeta potential parameter (e.g., magnitude or sign of zeta potential) that is sent to the controller 232 for feedforward control of the amount of coagulant added in the successive coagulant port. The fourth zeta potential sensor 224D may be used to provide feedback control or to verify that a sufficient amount of coagulant has been added.

It should be noted that as (1) the second zeta potential sensor 224B is paired with the first coagulant port 221 to form the first mixing zone, (2) the third sensor 224C is paired with the second port 222B to form the second mixing zone and (3) the fourth sensor 224D is paired with the third port 222C to form the third mixing port, in some instances the second, third and fourth sensors 224B, 224C, 224D are referred to herein as first, second and third sensors and the first sensor 224A, if used, may be referred to as the "initial sensor" 224.

The treated slurry from the mixing vessel 204 is discharged and flocculated. For example, the discharged slurry may be introduced into a flocculant feed system having a flocculant mix tank 295 for adding flocculant from flocculant source 44.

Various embodiments of the dosing system 1, 101, 201 may be configured to be a mobile system that allows the system to be transported to various sites such as a central location between drilling sites. The system may have a common frame or skid that supports the batch mix tank and the various pumps (e.g., coagulant pump, flocculant pump and/or water pump) and/or tanks (e.g., water tank, coagulant tank and/or flocculant tank). The system may include skids, rollers or legs which may be vertically extended (not shown) to allow the system to be pulled or lifted onto a transport vehicle (e.g., trailer). In other embodiments, the system includes ground-engaging wheels (or even tracks) for moving the system (e.g., is mounted to a trailer for transport). In other embodiments, the system is fixed at a site (i.e., is not mobile or arranged for disassembly and transport) and slurry (e.g., earthen slurry) is transported to the system without transport of the system during its lifespan.

Generally, the mix tank 4 is a batch mix tank in which batches of slurry are processed in succession such as when a sufficient amount of slurry has been collected to process a full batch of slurry. After the slurry is processed and discharged, a second slurry may be added to the batch mix tank 4 and processed as described herein to remove solids (e.g., dilution, coagulation and flocculation).

In embodiments in which earthen slurries are processed, after a first slurry from a first transport vehicle is processed in a pretreatment system 14 (FIG. 2), slurry from a second vehicle is processed in the pretreatment system 14. Depending on the relative sizes of the first and second slurries, the size of the collection vessel in the pretreatment system 14, and the size of the batch mix tank 4, the first and second slurries may be processed separately in succession in the batch mix tank or may be processed together (e.g., combined prior to introduction into the batch mix tank or combined in the batch mix tank).

Compared to conventional systems and methods for dewatering slurries, the systems and methods of the present disclosure have several advantages. In embodiments in which batch processing of slurry is used such as in systems in which slurry is processed upon collection of a full batch of slurry (e.g., as in dewatering of earthen slurries), the system may better recover from dosing errors as feedback may be more representative of the slurry being dosed. Use of relatively large batches allows smaller batches (e.g., vacuum truck slurries in embodiments in which earthen slurries are processed) to be combined which averages out variability in the smaller batches and results in a more consistent feed for various process stages.

Further, batch processing allows the zeta potential parameter (e.g., magnitude and/or sign of zeta potential) of the full batch to be monitored to control coagulant addition. In some embodiments, the signal-to-noise ratio threshold of the sensor is reduced relative to conventional zeta-potential analyzers (e.g., lab-scale analyzers) which increases the frequency at which a data point may be generated and decreases the required sampling time. The signal-to-noise ratio may be reduced as the system is configured to produce a consistent processing slurry for treatment (e.g., by processing in batches and addition of dilution water). Consistent processing allows operators to build a level of confidence in the measured zeta potential parameter. In embodiments in which only the sign of the zeta potential is monitored (and not the magnitude of the zeta potential), only the phase (or phase shift) may be monitored which differs from lab-scale analyzers which require particle size to be determined. This increases the flexibility of the system and decreases the required sampling time over conventional systems for measuring zeta potential.

In embodiments in which the zeta potential is monitored with a sensor that is an electroacoustic sensor, the system is well adapted to monitor the zeta potential in relatively high solid content slurries such as earthen slurries. Such electroacoustic sensors generate an oscillating acoustic pressure wave or an oscillating electric field voltage that are capable of being transmitted through such high solid content slurries.

In embodiments in which the contents of the tank are monitored to control coagulant addition, coagulant addition may be more precisely controlled preventing under- or over-dosing. Dilution of the slurry prior to or during coagulant addition allows for better mixing and contact of coagulant and slurry during dosing which reduces coagulant usage (e.g., mixing to less than about 40 wt % solids). Dilution allows high solids content slurries to be better processed. In embodiments in which the feed slurry is sampled or monitored to determine the solid content, the dilution water and flocculant volumes may be determined to calculate the amount of slurry added to the mix tank to achieve a desired fill height. Maintaining a desired fill height allows coagulant and flocculant to be better distributed throughout the slurry. In embodiments in which an auger-style mixer is used, the auger-style mixer is well-suited to mix relatively high-solids slurries. In embodiments in which the mixing system provides a variable mixing speed, the mixing system may provide a variable shear input to the fluid depending on the stage of mixing.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A system for dosing a slurry to remove suspended solids, the system comprising:
   a mix tank;
   an electroacoustic zeta potential sensor in fluid communication with the mix tank;
   a coagulant feed system for adding coagulant to the mix tank, the coagulant feed system being in fluid communication with the mix tank, the coagulant feed system comprising:
      a coagulant feed tank;
      a plurality of coagulant feed ports; and
      a coagulant control system, the coagulant control system comprising a controller communicatively coupled to the coagulant feed system and configured to terminate coagulant addition based on a zeta potential parameter.

2. The system as set forth in claim 1 wherein the zeta potential parameter is the sign or magnitude of the zeta potential, the controller being configured to terminate coagulant addition based on a change in the sign or magnitude of the zeta potential parameter.

3. The system as set forth in claim 1 wherein the coagulant feed system further comprises a coagulant feed pump and valve to control coagulant addition, the coagulant control system being communicatively coupled to the coagulant feed pump to control coagulant addition to the mix tank.

4. The system as set forth in claim 1 wherein the system is a mobile system to allow the system to be transported to different sites, the mobile system:
   comprising tires or tracks to move the system to different sites; and/or
   being supported by a frame or skid that allows the system to be loaded or unloaded from a transport vehicle.

5. The system as set forth in claim 1 further comprising:
   a flocculant feed system, the flocculant feed system comprising a flocculant pump in fluid communication with the mix tank;
   a flocculant control system communicatively coupled to the flocculant feed system; and
   an interface sensor for sensing a solid-liquid interface in the mix tank, the interface sensor being communicatively coupled to the flocculant control system to control the amount of flocculant added to the mix tank by the flocculant feed system.

6. The system as set forth in claim 1 comprising a water feed system for adding water to the mix tank to dilute the slurry.

7. The system as set forth in claim 1 wherein the mix tank includes an adjustable weir to allow supernatant water to be decanted.

8. A system for dosing a slurry to remove suspended solids, the system comprising:
   a coagulant feed system for adding coagulant to a slurry, the coagulant feed system comprising:
      a coagulant mixing vessel;
         a first coagulant feed port formed in the coagulant mixing vessel;
         a first zeta potential sensor upstream of the first coagulant feed port, a first mixing zone of the coagulant mixing vessel being defined between the first coagulant feed port and the first zeta potential sensor;
         a second coagulant feed port formed in the coagulant mixing vessel; and
         a second zeta potential sensor downstream of the second coagulant feed port, a second mixing zone of the coagulant mixing vessel being defined between the second coagulant feed port and the second zeta potential sensor;
      one or more coagulant feed pumps in fluid communication with the first and second coagulant feed ports; and
   a coagulant control system, the coagulant control system comprising a controller configured to control coagulant addition based on a zeta potential parameter sensed by the first and/or second zeta potential sensor.

9. The system as set forth in claim 8 wherein the coagulant feed system comprises:
   a third coagulant feed port; and
   a third zeta potential sensor downstream of the third coagulant feed port, a third mixing zone of the coagulant mixing vessel being defined between the third coagulant feed port and the third zeta potential sensor.

10. The system as set forth in claim 8 further comprising:
    a flocculant feed system comprising a flocculant mix tank; and
    a flocculant control system communicatively coupled to the flocculant feed system.

11. A method for dewatering earthen slurries, the method comprising:
    ejecting slurry from a slurry transport vehicle into a pretreatment system to remove an initial amount of solids from the slurry and produce a solids-depleted slurry;
    introducing the solids-depleted slurry into a system comprising:
       a mix tank;
       an electroacoustic zeta potential sensor in fluid communication with the mix tank;
       a coagulant feed system for adding coagulant to the mix tank, the coagulant feed system being in fluid communication with the mix tank, the coagulant feed system comprising:
          a coagulant feed tank;
          a plurality of coagulant feed ports; and
          a coagulant control system, the coagulant control system comprising a controller communicatively coupled to the coagulant feed system and configured to terminate coagulant addition based on a zeta potential parameter;
    adding coagulant to the solids-depleted slurry in the mix tank via the coagulant feed system to change the zeta potential of the slurry; and
    adding flocculant to the solids-depleted slurry in the mix tank to agglomerate suspended solids and form an agglomerated suspension; and
    separating solids from the agglomerated suspension.

12. The method as set forth in claim 11 wherein the slurry transport vehicle is a first vehicle and the slurry is a first slurry, the method further comprising:
    ejecting a second slurry from a second slurry transport vehicle into the pretreatment system to remove an initial amount of solids from the slurry and produce a second solids-depleted slurry;
    introducing the second solids-depleted slurry into the mix tank;
    adding coagulant and flocculant to the second solids-depleted slurry in the mix tank to agglomerate suspended solids and form an agglomerated suspension; and
    separating solids from the agglomerated suspension.

13. The method as set forth in claim 11 wherein the solids are separated by sedimentation, centrifugation, filtration or by thermal drying.

14. The method as set forth in claim 11 wherein the zeta potential parameter is the sign of the zeta potential or the magnitude of the zeta potential.

15. The method as set forth in claim 11 wherein coagulant is added in two or more doses, the method comprising measuring the zeta potential after each dose is added to determine if the zeta potential is reduced to an amount within a set point range, wherein coagulant addition is terminated after the zeta potential is within the set point range.

16. The method as set forth in claim 11 further comprising diluting the slurry by adding water to the mix tank.

17. The method as set forth in claim 11 wherein the slurry added to the mix tank is a first slurry and the coagulant added to mix tank is a coagulant first portion, the first slurry being added to the mix tank to form a first slurry batch, the method further comprising:
   discharging a treated first slurry batch from the mix tank;
   adding a second slurry to the mix tank to form a second slurry batch;
   adding a coagulant second portion to the mix tank;
   monitoring the magnitude of the zeta potential during addition of the coagulant second portion; and
   terminating addition of coagulant second portion to the mix tank when the magnitude of the zeta potential is within a set point range.

18. The method as set forth in claim 11 further comprising:
   monitoring a solid-liquid interface by an interface sensor during flocculant addition; and
   terminating flocculant addition based on output from the interface sensor.

19. The method as set forth in claim 11 wherein the mix tank is recirculated via a recirculation loop while adding coagulant and while adding flocculant, the mix tank being recirculated at a higher speed during coagulant addition relative to the speed during flocculant addition.

20. The system as set forth in claim 1 further comprising a recirculation loop.

* * * * *